United States Patent [19]

Donley et al.

[11] Patent Number: 4,623,389

[45] Date of Patent: Nov. 18, 1986

[54] ELECTROCONDUCTIVE SILVER COMPOSITION

[75] Inventors: Harold E. Donley, Oakmont; Cheryl E. Belli, New Kensington, both of Pa.

[73] Assignee: PPG Industries, Inc., Pittsburgh, Pa.

[21] Appl. No.: 725,597

[22] Filed: Apr. 22, 1985

[51] Int. Cl.$^4$ .............................................. H01B 1/02
[52] U.S. Cl. .................................. 106/1.14; 106/1.19; 106/1.25; 252/514
[58] Field of Search .............. 252/514; 106/1.14, 1.19, 106/1.25

[56] References Cited

U.S. PATENT DOCUMENTS

| | | | |
|---|---|---|---|
| 3,401,126 | 9/1968 | Miller et al. | 252/514 |
| 3,467,818 | 9/1969 | Ballentine | 219/522 |
| 3,547,835 | 12/1970 | Short | 252/514 |
| 3,553,109 | 1/1971 | Hoffman | 252/514 |
| 3,623,906 | 10/1968 | Akeyoshi et al. | 117/211 |
| 3,659,079 | 4/1972 | Whittemore | 219/522 |
| 3,900,634 | 8/1975 | Plumat et al. | 428/208 |
| 4,371,581 | 2/1983 | Uchikawa et al. | 428/304.4 |
| 4,469,625 | 9/1984 | Held | 252/514 |

Primary Examiner—Lorenzo B. Hayes
Attorney, Agent, or Firm—Andrew C. Siminerio

[57] ABSTRACT

A heated automobile backlight having a dark colored electroconductive grid. The composition includes silver powder, a glass frit such a lead borosilicate frit, and reducing agents such as stannous sulfate and chromic oxide.

13 Claims, No Drawings

ELECTROCONDUCTIVE SILVER COMPOSITION

BACKGROUND OF THE INVENTION

1. Field of the Invention

The present invention relates to heated windows, and more particularly, to heated windows for backlights in automobiles wherein the heating elements are dark colored electroconductive circuits secured to a surface of the windows.

2a. Technical Considerations

The deposit of moisture and ice on a automobile window has annoyed automobile owners considerably. Automobiles that are parked overnight are dangerous to drive until visibility is attained by removing the moisture deposit. In the past, this removal has been accomplished by applying a squeegee or scrapper to the surface of the window. Hot air blowers have also been employed to blow hot air across the surface of a fogged window. However, time is required to heat the air that is blown across the surface of the window to a temperature that is sufficient for the hot air to perform efficiently in the defogging or deicing function.

In addition, the inner surface of automobile windows tends to fog whenever the windows are closed and the moisture from the breath of occupants condenses on their inner surfaces. This source of fogging has also been difficult to remedy using the devices described above.

As an alternative to scraping, resistance wires have been attached to the surface of monolithic glass sheets or laminated glass plastic windows or embedded within a plastic interlayer of laminated windows to heat the window by passing electric current through the resistance wires connected between spaced bus bars. When a potential difference is applied between the bus bars, the heating wires convert the electric energy into sufficient heat energy to defog or deice the window as required.

It is common practice throughout the automotive industry to use silver ceramic paste which adheres to the glass surface to form the electroconductive heating circuits required to heat an automotive window. The pastes are generally silkscreened onto a glass sheet in a pattern that generally includes thin parallel horizontal lines connected at their ends near the edge of the window by wider bus bars. The silver ceramic materials provide sufficient electrical resistivity in the thicknesses and widths at which they are applied such that current to the electric circuit from an automobile 12 volt electrical energy system, will cause the circuit to heat and thus defog or deice the window within a reasonable amount of time.

The color of typical production silver ceramic pastes after being fired onto clear float glass, when viewed through the glass, ranges from a yellow to a medium brown color depending on whether the paste is applied to the air or tin side of a sheet of float glass. This color is slightly darker when viewed through tinted float glass. It is believed that this color results from the ionization of the silver of the paste during heating, and little or no reduction of these silver ions. It is the desire of automobile stylists, for cosmetic and aesthetic effects, to have a darker grid line color for the electroconductive heating elements.

2b. Patents of Interest

U.S. Pat. Nos. 3,467,818 to Ballentine and 3,659,079 to Whittemore, teach an electrically heated window panel wherein the glass surface silkscreen with thin lines of silver ceramic paste that are connected by bus bars. The typical ceramic conductive coating material includes a highly conductive metal powder, such as silver, in a vitrifying binder. The binder consists of lead borosilicate glass and a carrying medium.

U.S. Pat. No. 3,623,906 to Akeyoshi et al. teaches an electrically heated rear window for a motor vehicle wherein a plurality of parallel strips of an electroconductive frit are fired onto a glass window and electrically connected together by bus bars. The frit consists of finely divided electrically conductive metals such as silver, gold, copper or platinum, a low temperature melting powdered glass, such as lead silicate glass, and an organic binder.

U.S. Pat. No. 3,900,634 to Plumate et al. teaches an electrically heated panel with electrically conductive strips of paste having silver particles intermixed with a liquid vehicle and glass particles having a softening point lower than that of the glass substrate. The silver and glass particles are below five microns in size. The glass particles include two different glass compositions.

SUMMARY OF THE INVENTION

The present invention provides a composition for coating an automobile backlight to form a dark color electroconductive grid. The composition includes silver powder, a glass frit such as a lead borosilicate frit, reducing agents such as stannous sulfate and chromic oxide and rheology agents.

The present invention also provides an electrically heated glass product with a dark colored electroconductive coating. Colloidal silver encapsulated by the glass immediately adjacent to the coating. The electroconductive coating includes a lead borosilicate frit, silver powder and a silver ion reducing agent.

The present invention further provides a method of applying an electroconductive pattern to a glass sheet. A silver ceramic coating including a silver powder, a glass frit, a silver ion reducing agent, and a carrying medium is applied to the glass to form a pattern. The glass is heated to a temperature sufficient to ionize the silver powder at the surface of the glass and fuse the glass frit.

DETAILED DESCRIPTION OF THE INVENTION

The typical electroconductive circuit for a heated backlight includes a plurality of strips and bus bars made from an electroconductive frit containing paste. Typically, the strips are approximately 1/32" (0.079 cm) wide and are interconnected at their ends by bus bars which are approximately ¼" (0.635 cm) wide. The electroconductive circuit is formed on the glass by conventional silkscreening methods, e.g. as taught in U.S. Pat. No. 4,433,623 to Beckim herein incorporated by reference. The thickness of the strips and bus bars is generally uniform due to the nature of the silkscreening operation and ranges between 1 to 1.5 mils.

Although not limiting to the present invention, when the backlight to be coated with such a design is rectangular or quadrilateral, having substantially straight and parallel upper and lower longitudinal edges, the elongated electroconductive strips are generally spaced approximately 1 inch (2.54 cm) apart and are parallel to one another and straight. When the upper and lower edges of the backlight are bowed, or are of different configurations from one another, automotive stylists generally prefer the electroconductive strips to extend between the opposed bus bars in arcuate paths, with the upper most strip conforming in curvature substantially to the curvature of the upper longitudinal edge of the backlight, and the lowest electroconductive strip conforming to the shape of its lower edge.

To protect the strips and bus bars from excessive exposure to atmospheric conditions, the strips and bus bars are all applied to the inner surface of the backlight. Under such circumstances, no protective coating has been found necessary.

After the desired pattern is applied to the glass, it is fired in a furnace where the glass is heated to its deformation temperature of approximately 1200° F. During this heating, the metal ceramic frit fuses onto the surface of the glass sheet, which faces upward during a horizontal bending operation. The heat softened glass is then shaped, for example, by sandwiching the glass between a pair of press bending molds immediately outside the furnace or by some other shaping technique well known in the art. When the glass bending is completed, the glass sheet is removed from the hot atmosphere and chilled as rapidly as possible to temper the glass sheet. Since the strips and bus bars have fused onto the glass surface during the heating operation, they remain in the exact configuration in which they were applied to the cold glass through the stencil in the silkscreening process when the glass is chilled.

After tempering, a means adapted for connecting the electroconductive circuit to a power source is attached to the circuit. Although not limited by this invention, generally this connection means is a metallic braid or a terminal clip. Each is preferably soldered to the bus bar and provides a connection to a lead wire and power source.

In accordance with this invention to provide a dark colored electroconductive circuit, the electroconductive strips and bus bars are typically formed of an electroconductive coating material which includes silver powder, lead borosilicate frit, silver reducing agents, a carrying medium, and rheology control agents.

The purpose of each component of the composition and its proportional limits, are defined as follows. The silver powder contributes to the electrical conductivity of the circuit and provides the dark grid line color. The weight percent range for the silver powder is 60 to 85% with a preferred particle size range of 0.5 to 1.5 microns. The frit is used to fuse and bind the silver ceramic coating to the glass surface. The preferred frit is a No. 2141 lead borosilicate glass frit available from Drakenfeld Color Company, Pennsylvania. The weight percent range for the frit is 2 to 15% with a preferred particle size range of 0.2 to 2.0 microns. Other frits can be used as long as they are not reactive with the silver and their melting point is not too high or too low with respect to the temperatures used in a bending and tempering operation. If the melting point is too low, the silver powder particles will separate and tend to move toward the upper surface of the coating. If the melting point is too high, the frit will not melt and fuse the coating to the glass surface. The reducing agents reduce silver ions formed during the firing of the coating in a manner to be discussed later. Chromic oxide and stannous sulfate are the preferred silver reducing agents with weight percentage ranges of 1 to 12% and 0.1 to 20%, respectively, although other reducing agents with trivalent chromium and divalent tin can be used. These reducing agents can be used individually with varying effectiveness, but preferably a combination of the two should be used. A combination of chromic oxide and stannous sulfate preferably should not exceed 20% of the weight of the coating since the electrical properties and solderability of the bus bands will be compromised. Pine oil is the preferred carrying medium and acts to disperse and mix the active components of the paste and to provide proper viscosity for the silkscreening process. The amount of pine oil is varied depending on the weight percentage of the other active components. Although not limited by this invention, other compositions that can be used as a carrying medium include high molecular weight alcohols, such as cetyl alcohol and hexadecanol, and high molecular weight polyhydric alcohols. Rheology control agents are added to control the flow of the coating after it is applied to the glass. Although not limited by the invention, isostearic acid, colloidal silica, and the amino salt are the preferred agents. Straight or branched chain hydrocarbon derivatives of a mono-basic carboxylic acid such as isovaleric acid, hexadecanoic acid, and isodecanoic acid can be used in place of the isostearic acid. Morpholine fatty acid salts can be used instead of the amino salt. Aluminum oxide or zirconium oxide can be substituted for the colloidal silica. The colloidal silica used in the preferred embodiment is available under the tradename Cab-O-Sil from Cabot Corporation, Massachusetts. The amino salt is available under the tradename Bykanol-N from Mallinckrodt Inc., Missouri. As with the pine oil, the amount of these rheology control agents depends on the weight percentage of the other active components.

When the silver ceramic coating containing the reductants is applied to the air side of a sheet of float glass by silkscreening or in any other manner well known in the art and fired to the heat deformation temperature of the glass, the elemental silver in the coating near the glass surface ionizes and the silver ions diffuse into the hot glass. The chromic oxide and/or stannous sulfate reduce the silver ions that have diffused a short distance into the glass substrate as well as the silver ions at the glass surface, to elemental silver. The elemental silver agglomerates to form silver colloids that are encapsulated by the glass. The encapsulated silver colloids are on the order of 100 angstroms in diameter. The small particle size absorbs the light wavelengths in the visible range and thus produces a darker color than the conventional paste when viewed through the glass, while the elemental silver remaining in the coating provides the electroconductivity of the fired grid.

When the silver ceramic coating is applied to the tin side of a sheet of float glass, the reducing agents again reduce the silver ions, but there is additional silver reduction due to the stannous ions, $Sn^{+2}$, in the surface of the tin side of the float glass. These stannous ions reduce the silver ions that diffuse deeper into the glass sheet. As a result more silver is reduced than on the coated air side and the large amount of encapsulated colloidal silver produces a dark or black grid color, when viewed through the glass.

It should be noted that when this composition is applied to the air side of a sheet of float glass, there will be little if any $Sn^{+2}$ in the coated surface to reduce sufficient additional silver ions to produce as dark a color as on the tin side coated glass. Increasing the amount of stannous sulfate on the air side in an effort to increase the amount of $Sn^{+2}$ and thus increase the silver ion reduction would produce certain deleterious effects described below.

The purpose of using both chromic oxide and stannous sulfate in the composition is to balance the reduction of the silver ions while retaining conductivity in the electroconductive grid. The stannous sulfate will reduce some of the silver ions but a large amount of silver ions must be reduced in order to produce a dark color in the grid. It has been found that if too much stannous sulfate is used, the conductivity and solderability of the bus bar will be reduced. To avoid this detrimental effect, chromic oxide is added to help reduce the required amount of silver ions to elemental silver without any deleterious effect on the bus bar. If chromic oxide were used by itself, sufficient amounts of silver ions could be reduced to produce the desired dark color but the solderability of the bus bar would be sacrificed. In addition, the amount of chromic oxide must be carefully controlled so that a sufficient quantity of $Ag^{+1}$ is not reduced, so as to maintain the circuit's electroconductivity. If electroconductivity and/or solderability are of no concern, the chromic oxide could be used without the stannous sulfate.

A series of tests were performed using varying amounts of the reductants, chromium oxide and stannous sulfate, to observe their effect on color, electrical resistancy, and solderability of a fired electroconductive grid. During testing, the amount of oil was varied to achieve the proper viscosity during coating. As a result, the weight percentage of silver powder varied between approximately 65% and 77%.

Testing for color required visual observation and comparison to the standard production silver ceramic coating. In addition, sample formulations were tested either for resistivity or for amperage, both of which produce related results. The allowable amperage range is 18 to 22 amps with 20 amps being the nominal result. To test solderability, a pull test was performed. A metallic braid was soldered to the ceramic bus bar and weights were suspended from the braid at 90° from the glass. The acceptable pull test value range is 20 to 25 lbs. (9.09 to 11.36 kg).

The following are examples of silver pastes as taught in the invention.

| | Amount grams | Weight Percent |
|---|---|---|
| Silver powder | 37.62 | 68.40 |
| Lead Borosilicate Frit | 4.26 | 7.75 |
| Pine Oil | 7.02 | 12.76 |
| Isostearic Acid | 0.50 | 0.90 |
| Amino Salt of an Acid Phosphate Ester | 0.50 | 0.90 |
| Colloidal Silica ($SiO_2$) | 0.25 | 0.45 |
| Chromic Oxide ($Cr_2O_3$) | 0.54 | 0.98 |
| Stannous Sulfate ($SnSO_4$) | 4.30 | 7.82 |
| | 55.00 | 100.00 |

| | Amount grams | Weight Percent |
|---|---|---|
| Silver powder | 42.00 | 76.36 |
| Lead Borosilicate Frit | 1.30 | 2.36 |
| Pine Oil | 6.00 | 10.91 |
| Isostearic Acid | 0.25 | 0.46 |
| Amino Salt of an Acid Phosphate Ester | 0.25 | 0.46 |
| Colloidal Silica ($SiO_2$) | 0.20 | 0.36 |
| Chromic Oxide ($Cr_2O_3$) | 1.15 | 2.09 |
| Stannous Sulfate ($SnSO_4$) | 3.85 | 7.00 |
| | 55.00 | 100.00 |

Example 1 has produced medium to dark red-brown electroconductive grid lines on the air side of float glass and Example 2 has produced dark gray and black electroconductive grid lines on the tin side of float glass.

In testing the new silver ceramic compositions on the air side of float glass three formulations were initially tested. The formulations were standard production silver ceramic pastes except that one contained copper selenide, one contained stannous sulfate, and the control contained neither. The fired bus bars did not develop the dark brown color obtained in lab fired samples. Stannous sulfate turned out to be the better additive, producing a yellow-brown color whereas the copper selenide gave the normal bright yellow color equal to the control. This corresponded with the lab results which also showed stannous sulfate to be better than copper selenide as a darkening additive. Other properties of the bus bars with the additives were acceptable. The electrical resistance of both was equal to the control. The adhesion to the glass was good and equal to the control. Solderability checked out well and all three passed the pull test.

In the next set of air side tests, five different formulations were tested. The following amounts and combinations of chromic oxide and stannous sulfate as additives to produce a dark red-brown color on the air side were run: (1) 5% $Cr_2O_3$, (2) 3.8% $Cr_2O_3$-1.2% $SnSO_4$, (4) 5% $Cr_2O_3$14 5% $SnSO_4$ and (5) 8% $SnSO_4$-2% $Cr_2O_3$. The greatest coloration, a medium brown, was produced by the 5% $Cr_2O_3$ and 5% $Cr_2O_3$-5% $SnSO_4$ formulations. The resistances of the chromic oxide containing formulations were slightly higher than the production control, but the ones containing stannous sulfate were equal to the control which was 75% silver. The five formulations ranged from 66% to 69% silver. Solderability of the bus bars having only the $Cr_2O_3$ additive was poor, while the formulation with 10% $SnSO_4$ was excellent. The other three ranged from good to fair. The 10% $SnSO_4$ samples had pull tests of 25–30 lbs (11.36 to 16.64 kg) and those of the 5% $Cr_2O_3$-5% $SnSO_4$ samples were 12–25 lbs (5.54 to 11.36 kg). The rest were below these values. The production control was in the range of 20-25 lbs (9.09 to 11.36 kg). It is believed that the oxidizing conditions in the furnace nullified some of the reducing reaction of these two compounds which were found to be very effective in the lab producing deep red-brown colors under laboratory test conditions.

Additional testing on the air side continued with two formulations using the reducing agents stannous sulfate, $SnSO_4$, and chromic oxide, $Cr_2O_3$. Both formulations contained 15% by weight reducing agents—the first 100% $SnSO_4$ and the other 3 to 1, $SnSO_4$ to $Cr_2O_3$. Both produced a medium brown color with the latter being slightly darker. Electrical resistances of the samples were equal to the production control containing 67% Ag which was comparable to the 65% Ag in the tested formulations. Solderability and pull tests were good and equal to the production control for the bus bars produced from the formulation with the 100% $SnSO_4$ additive, while the solderability and pull tests of the 3 $SnSO_4/Cr_2O_3$ additive was only fair. Again, it was observed that the oxidizing conditions prevalent in the furnace nullified some of the reducing reaction of these two compounds which were found to be very effective in laboratory testing.

The formulation shown in Example 1 was tested and produced a brown color on the air side. Solderability was good with the pull test ranging from 10-25 lb. (4.54 to 11.36 kg). The amperage test averaged 18.7 amps. It is believed that the reason for the low amperage was that the circuit was printed too thin causing the resistance to be a little high.

In the initial testing on the tin side of float glass, 15% stannous sulfate and 0% chromic oxide was used to coat glass. After heating the formulation produced a medium brown coating. Although the resulting color was darker than the standard silver ceramic paste which is 75 weight percent silver and does not include any reductants, it was still not dark enough.

In the next set of tests on the tin side, two silver ceramic formulations were hand screened as bus bars in pairs across the width of a backlight in order to compare properties within the same part. The first formulation included 10% stannous sulfate and 5% chromic oxide. The second formulation included 10% stannous sulfate and 3% chromic oxide. Both pastes produced dark grid lines when compared to the light yellow brown lines of the standard production paste. Subsequent testing of the fired coatings showed that the first formulation had an average pull test of 15 pounds (6.82 kg) and had a 10% higher resistance when compared to the standard coating. The second formulation had an average pull test of 25 pounds (11.36 kg) and a resistance comparable to the standard coating.

Tin side screened backlights using the 10% stannous sulfate and 3% chromic oxide formulation were produced for additional testing under simulated production conditions. The resulting grid was again dark in color when compared to the standard production coating. The circuit tested slightly low at 17.6 amps but most of the pull tests were acceptable in the range of 20 to 25 pounds (9.09 to 11.36 kg). However, two failures did occur.

Another silver ceramic formulation was tested with a 23% reduction of reductants, while maintaining the same ratio of the two compounds. The formulation included 2.3% chromic sulfate and 7.7% stannous sulfate. A run of tin side screened backlights were compared with production backlights being run on the same line. Positive results were obtained as dark grid lines were formed, average amperage readings were 20 amps, and pull test values ranged from 20 to 33 pounds (9.09 to 15.0 kg).

To confirm the results of the prior test, another production type test trial was conducted using a formulation of 2.3% chromic oxide and 7.7% dehydrated stannous sulfate. Dehydrated stannous sulfate was used to determine if water content of the stannous sulfate effected the test results. All properties were initially acceptable: dark colored grid lines, average of 20 amps for the amperage test, and pull test passed. However after running about 70 backlights, approximately one-half of the solder joints failed and the amperage test dropped out of range to 17.5 amps. The cause of this change in test results is not known.

The form of the invention shown and described represents an illustrative preferred embodiment and certain modifications thereof. It is understood that various changes may be made without departing from the spirit of the invention as defined in the claimed subject matter that follows.

We claim:

1. In an electroconductive composition for coating at least a portion of a glass substrate including silver powder, a glass frit, and a carrying medium, the improvement comprising:
   silver ion reducing agent containing a trivalent chromium compound and a divalent tin compound.

2. The composition as in claim 1 wherein said trivalent chromium compound is chrome oxide.

3. The composition as in claim 1 wherein said divalent tin compound is stannous sulfate.

4. The composition as in claim 1 wherein said reducing agent includes stannous sulfate and chromic oxide.

5. The composition as in claim 4 wherein said composition is, by weight, 1 to 12% chromic oxide and 0.1 to 20% stannous sulfate and further wherein the total combined weight percentage of said chromic oxide and said stannous sulfate is not more than 20%.

6. The composition as in claim 5 wherein said carrying medium includes high molecular weight alcohols.

7. The composition as in claim 5 wherein said carrying medium is pine oil.

8. The composition as in claim 7 wherein said composition further includes rheology control agents.

9. The composition as in claim 8 wherein said frit is a lead borosilicate frit.

10. The composition as in claim 9 wherein said composition is, by weight, 60 to 85% silver powder with a particle size range of 0.5 to 1.5 microns.

11. The composition as in claim 10 wherein said composition is, by weight, 2 to 15% lead borosilicate glass frit with a particle size ranging from 0.5 to 2.0 microns.

12. The composition as in claim 11 wherein said composition is, by weight, 76.36% silver powder, 2.36% lead borosilicate frit, 10.91% pine oil, 2.09% chromic oxide, 7.00% stannous sulfate and 1.28% rheology agent.

13. The composition as in claim 11 wherein said composition is, by weight, 68.4% silver powder, 7.75% lead borosilicate frit, 12.76% pine oil, 0.98% chromic oxide, 7.82% stannous sulfate, and 2.25% rheology agent.

* * * * *